United States Patent

Masui et al.

Patent Number: 5,509,990
Date of Patent: Apr. 23, 1996

[54] PROCESS FOR PRODUCING A MULTILAYER MOLDED ARTICLE

[75] Inventors: Shohei Masui, Aichi; Masahito Matsumoto, Osaka; Nobuhiro Usui, Osaka; Toshihiro Hosokawa, Osaka; Ryuichi Ishitsubo, Osaka, all of Japan

[73] Assignee: Sumitomo Chemical Company, Limited, Osaka, Japan

[21] Appl. No.: 174,757

[22] Filed: Dec. 29, 1993

Related U.S. Application Data

[63] Continuation of Ser. No. 883,907, May 13, 1992, abandoned, which is a continuation of Ser. No. 457,313, Dec. 26, 1989, abandoned.

[30] Foreign Application Priority Data

Dec. 27, 1988 [JP] Japan ......................... 334088

[51] Int. Cl.$^6$ ................. B29C 39/12; B29C 33/14; B29C 33/42
[52] U.S. Cl. ............ 156/242; 156/245; 264/257; 264/263; 264/266; 264/275; 425/123
[58] Field of Search .................. 264/46.4, 46.6, 264/247, 257, 259, 266, 263, 275; 425/129.1, 111, 112, 123; 156/242, 245, 213, 214

[56] References Cited

U.S. PATENT DOCUMENTS

| | | | |
|---|---|---|---|
| 2,977,639 | 4/1961 | Barkhuff | 264/46.8 |
| 3,258,511 | 6/1966 | McGregor | 264/46.6 |
| 4,829,644 | 5/1989 | Kondo | 264/46.8 |
| 4,833,741 | 5/1989 | Mizuno | 264/46.6 |
| 4,861,543 | 8/1989 | Rafferty | 264/553 |
| 5,053,179 | 10/1991 | Masui et al. | 264/275 |

FOREIGN PATENT DOCUMENTS

| | | |
|---|---|---|
| 186016 | 7/1986 | European Pat. Off. |
| 186015 | 7/1986 | European Pat. Off. |
| 2439525 | 10/1978 | France |
| 833118 | 3/1952 | Germany |
| 3704528 | 2/1988 | Germany |
| 3743318 | 12/1988 | Germany |
| 333198 | 9/1989 | Japan |
| 2190621 | 11/1987 | United Kingdom |

OTHER PUBLICATIONS

Patent Abstract of Japan, vol. 10, No. 115 (M–474) 2172, 30th Apr. 1986; and JP–A–60–244 522 (Nihon) 4 Dec. 1985, Abstract only, figures.
Patent Abstracts of Japan, vol. 11, No. 64 (M–565) 2511, 26th Feb. 1987; & JP–A–61 220 822 (Meiwa Sangyo) 1 Oct. 1986, Abstract only, figures.
Patent Abstracts of Japan, vol. 9, No. 303 (M–434) 2026, 30th Nov. 1985; & JP–A–60 141 524 (Aida), 26 Jul. 1985, Abstract only, figures.
Patent Abstracts of Japan, vol. 8, No. 280 (M–347), 21st Dec. 1984, and JP–A–59 150 740 (Sumitomo), 29 Aug. 1984, figures.
Patent Abstracts of Japan, vol. 4, No. 158 (M–39) 640, 5th Nov. 1980, and JP–A–55 107 436 (Ikeda) 18 Aug. 1980, Abstract, figures.
Patent Abstracts of Japan, vol. 10, No. 115 (M–474 2172, 30th Apr. 1986; & JP–A–60 244 526 (Nihon) 4 Dec. 1985, Abstract, figures.
Patent Abstracts of Japan, vol. 6, No. 232 (M–172) 1110, 18th Nov. 1982; and JP–A–57 133 019 (Kasai Kogyo) 17 Aug. 1982, Abstract, figures.

*Primary Examiner*—Jan H. Silbaugh
*Assistant Examiner*—Angela Ortiz
*Attorney, Agent, or Firm*—Birch, Stewart, Kolasch & Birch

[57] ABSTRACT

A multilayer molded article comprising a resin body and at least one sheet of a skin material an edge part of which is present in a surface area of the resin body is efficiently produced by clamping an edge part of a skin material or mated edge parts of adjacent skin materials during molding.

9 Claims, 4 Drawing Sheets

5,509,990

PROCESS FOR PRODUCING A MULTILAYER MOLDED ARTICLE

This application is a continuation, of application Ser. No. 07/883,907 filed on May 13, 1992, which is a Continuation of application Ser. No. 07/457,313 filed Dec. 26, 1989, both now abandoned.

BACKGROUND OF THE INVENTION

1. Field of the Invention

The present invention relates to a process and a mold for producing a multilayer molded article comprising a resin body and at least one sheet of a skin material having its edge part in the surface area of the resin body.

2. Description of the Related Art

A multilayer molded article comprising a resin body and a skin material laminated on the resin body has good appearance due to its high quality and warm feeling. The multilayer molded article greatly improves textures of a resin molded article such as cool feeling and provides an article with high value and beauty.

In fact, the multilayer molded articles are widely used as automobile interior materials or furnishing materials.

To improve an ornamental effect of the multilayer molded article comprising the skin material, it is desired to laminate two or more sheets of the skin materials on one surface of the resin body or to laminate one sheet of the skin material on a part of the surface of the resin body. However, the conventional processes or molds for producing the multilayer molded article cannot produce such an improved multilayer molded article. The mating edges of two sheets of the skin materials or the free edge of the skin material covering a part of the surface of the resin body cannot be beautifully finished.

SUMMARY OF THE INVENTION

One object of the present invention is to provide a process for producing a multilayer molded article comprising a resin body and at least two sheets of skin materials which are laminated on one surface of the resin body.

Another object of the present invention is to provide a process for producing a multilayer molded article comprising a resin body and one sheet of a skin material laminated on a part of a surface of the resin body.

A further object of the present invention is to provide a mold for producing a multilayer molded article comprising a resin body and at least two sheets of skin materials which are laminated on one surface of the resin body.

A yet further object of the present invention is to provide a mold for producing a multilayer molded article comprising a resin body and one sheet of a skin material laminated on a part of a surface of the resin body.

According to a first aspect of the present invention, there is provided a process for producing a multilayer molded article comprising a resin body and at least two sheets of skin materials which are laminated on one surface of the resin body, which process comprises steps of:

mating an edge part of one of the adjacent skin materials on an edge part of another, clamping the mated edge parts and spreading the skin materials between a male mold and a female mold, supplying a mass of resin melt between the skin materials and the mold which is located on a side on which the clamped edge parts are present, and closing the male and female molds to form the multilayer molded article.

According to a second aspect of the present invention, there is provided a process for producing a multilayer molded article comprising a resin body and one sheet of a skin material laminated on a part of a surface of the resin body, which process comprises steps of:

clamping an edge part of the skin material and spreading the rest of the skin material between a male mold and a female mold, supplying a mass of resin melt between the skin material and the mold which is located on a side on which the clamped edge part is present, and closing the male and female molds to form the multilayer molded article.

According to a third aspect of the present invention, there is provided a mold for practicing the processes of the present invention, which comprises a male mold, a female mold and clamping means for clamping an edge part of a skin material or mated edge parts of adjacent skin materials.

DETAILED DESCRIPTION OF THE DRAWINGS

Figure 1:
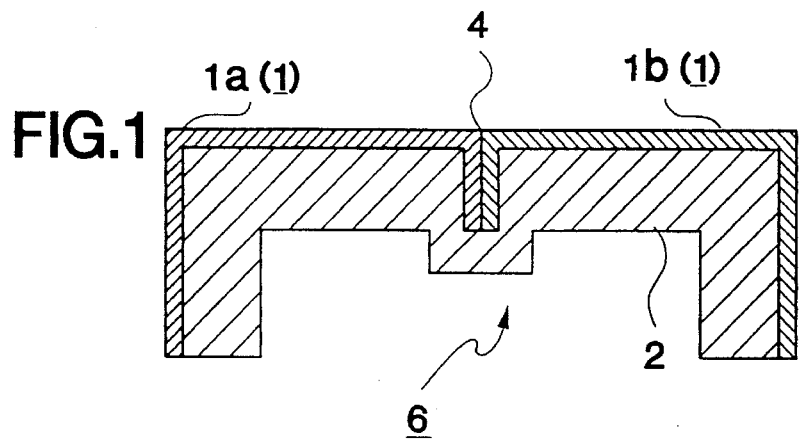
FIG. 1 shows a cross section of a multilayer molded article comprising a resin body and two sheets of skin materials which are laminated on one surface of the resin body.

FIG. 1 shows a cross section of a multilayer molded article 6 which comprises a resin body 2 and a skin material 1 consisting of two sheets of skin materials 1a and 1b the edge parts 4 of which are mated together.

Figure 2:
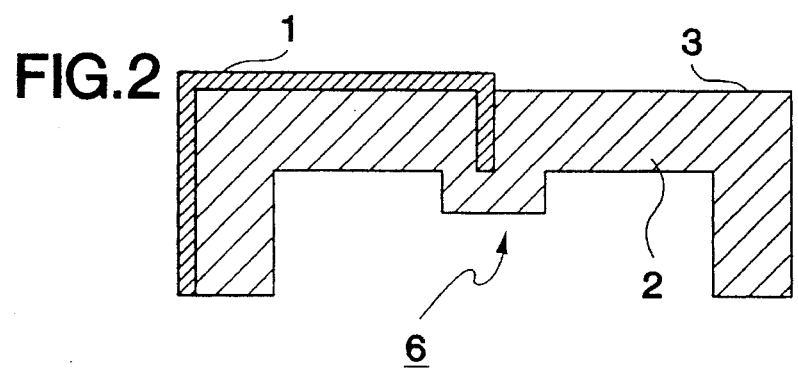
FIG. 2 shows a cross section of a multilayer molded article comprising a resin body and one sheet of a skin material which is laminated on a part of a surface of the resin body, FIGS. 3, 4 and 5 schematically show the process for producing a multilayer molded article comprising a resin body and at least two sheets of skin materials which are laminated on one surface of the resin body according to the present invention.
Figure 3:
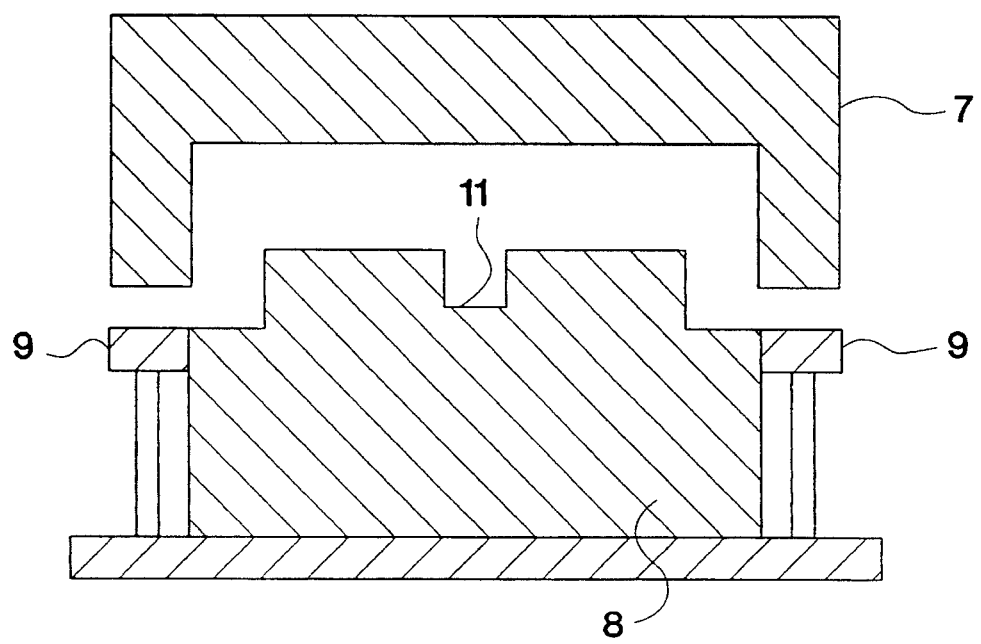

FIG. 2 shows a cross section of a multilayer molded article 6 which comprises a resin body 3 and one sheet of a skin material 1 laminated on a part of a surface of the resin body 2.

In the present invention, the skin material may be any of conventionally used materials. Specific examples of the skin material are woven or non-woven fabric, nets made of metals, fibers or thermoplastic resins, paper, metal foils, and a sheet or a film of a thermoplastic resin or elastomer. The skin material may be decorated with uneven patterns such as grain patterns, printing, dying and the like. In addition, the skin material may be made of foamed materials of thermoplastic resins or rubbers. Also, a laminate comprising at least two layers each made of the same material or different materials which are bonded to each other with an adhesive can be used as the skin material. Before the skin material is supplied in the mold, a part or whole of the skin material may be preheated to adjust tensile stress and elongation.

As the resin to be molded by the process of the present invention, any of the conventional resins used in compression molding, injection molding and extrusion molding can be used. Specific examples of the resin are non-expandable or expandable resins of thermoplastic resins (e.g. polypropylene, polyethylene, polystyrene, acrylonitrile-styrene-butadiene copolymer, nylon, etc.), and thermoplastic elastomers (e.g. ethylene-propylene copolymer, styrene-butadiene copolymer, etc.). The resin may contain at least one additive such as fillers (e.g. inorganic fillers and glass fibers), pigments, lubricants, antistatic agents and the like.

When two or more sheets of the skin materials are used, the mated edge parts may be bonded together with an adhesive or by welding. Since the bonding strength with the adhesive or by welding is not sufficient to resist a pulling force during the molding of the multilayer molded article, and the mated edge parts are ruptured, torn or displaced. Therefore, the mated edge parts should be clamped.

The mold for producing the multilayer molded article according to the present invention will be illustrated by making reference to FIGS. 3 through 7.

The mold comprises a female mold 7, a male mold 8, clamping means P for holding the mated edge parts 4 of the skin materials 1a and 1b or the free edge part 4 of the skin material, and an engaging groove 11 for receiving the clamping means.

The clamping means P has a part Pa for clamping the skin material edge part(s), and consists of alternately positioned wide parts Ph and narrow parts Pn. In the wide parts, conduits Pl for passing the resin melt (cf. FIGS. 6A, 6B and 6C).

Around the mold, a clamping frame 9 is provided to hold the skin material.

Figure 5:
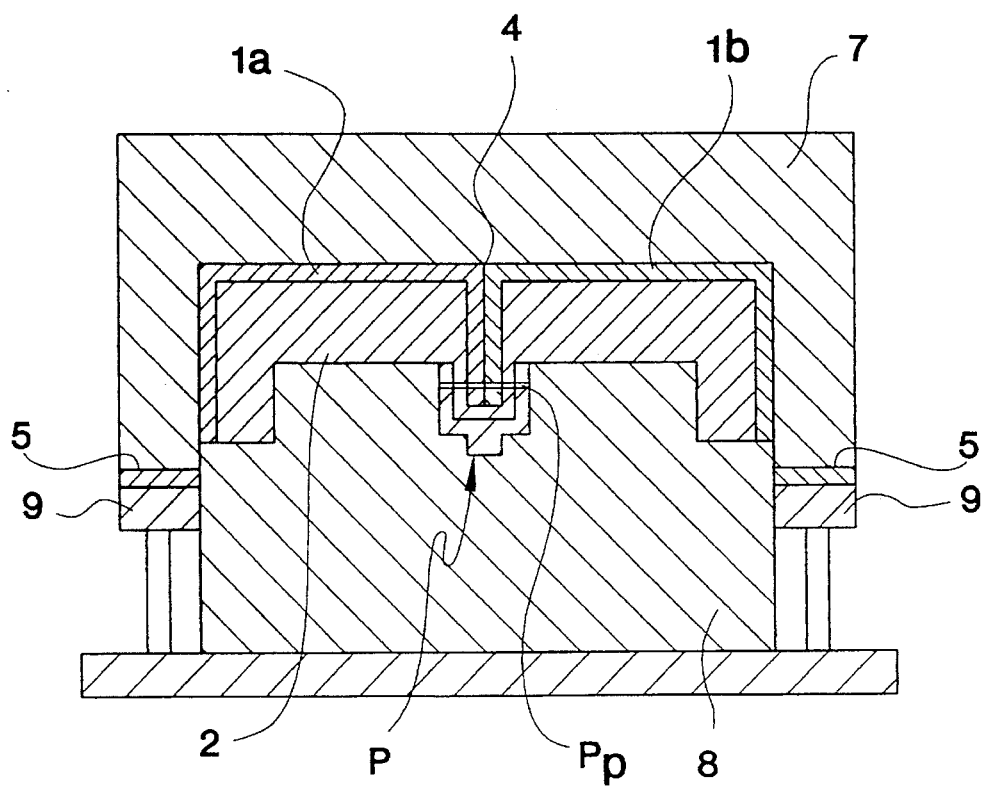
Figure 6A:
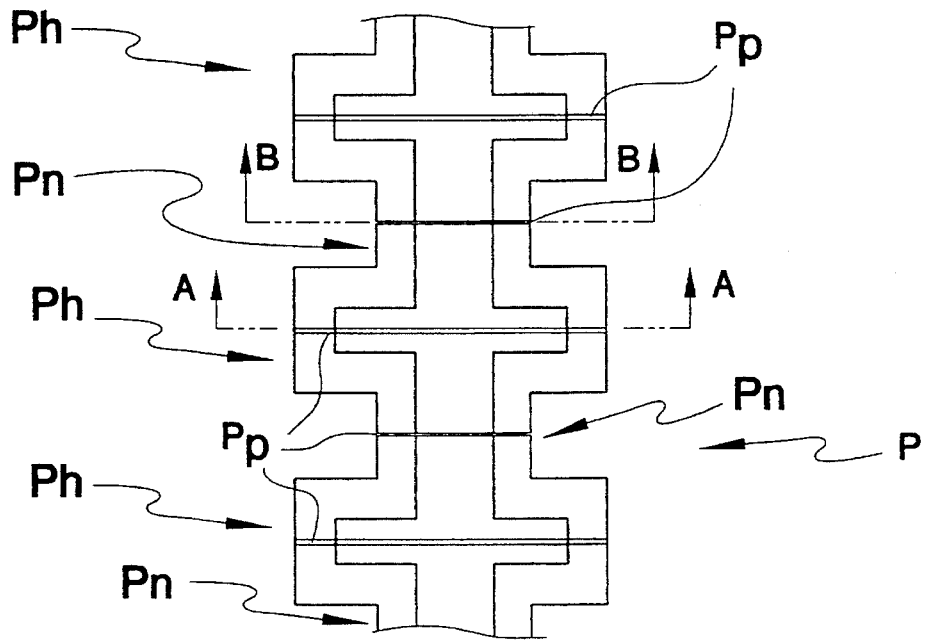
FIG. 6A shows a plane view of the clamping means for clamping the edge parts of the skin materials.
Figure 6B:
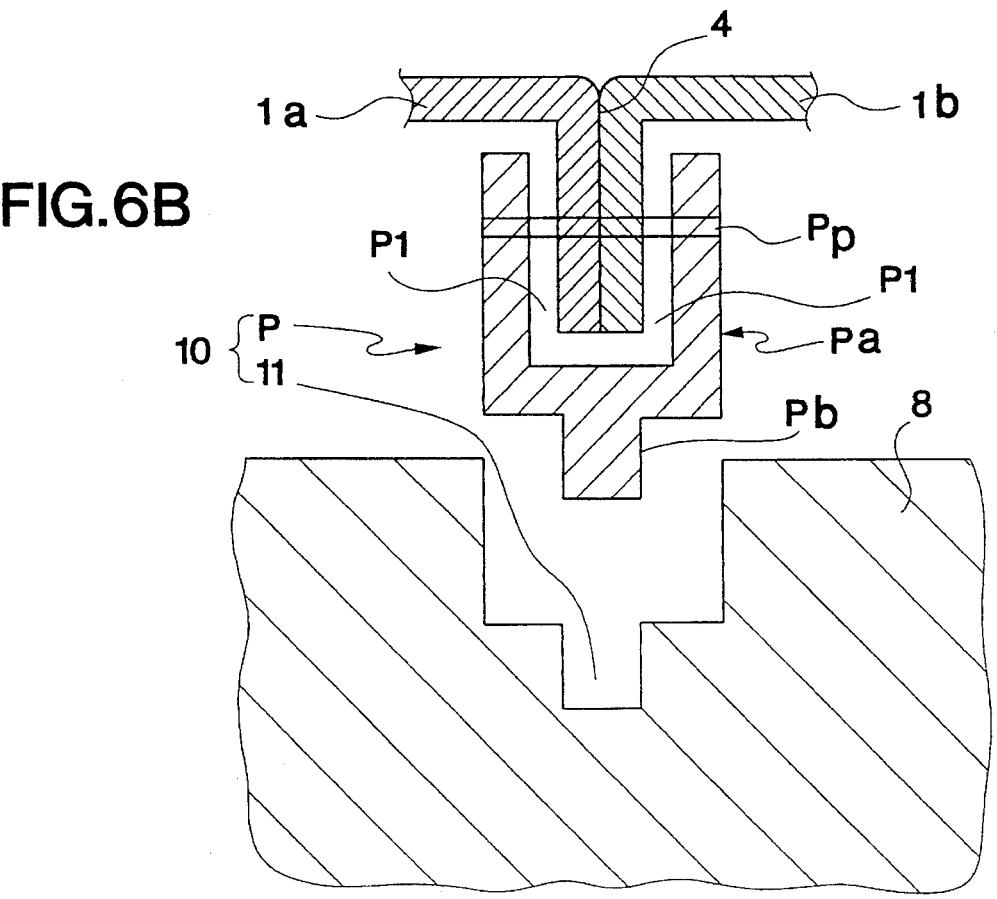
FIGS. 6B and 6C show cross sections of the clamping means of FIG. 6A along the lines A—A and B—B, respectively.
Figure 6C:
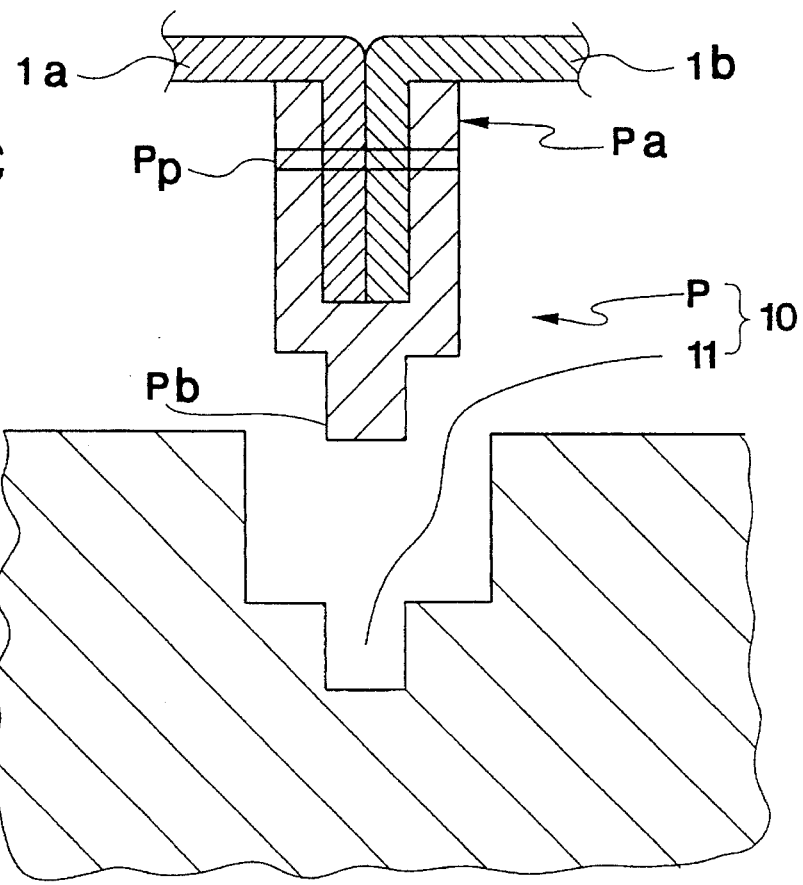

In the embodiment of FIGS. 5 and 6, the male mold 8 has a mechanism 10 for fixing the clamping means P. The mechanism 10 consists of the engaging groove 11 and the part Pa for clamping the skin material edge part(s), and the part Pa is inserted in the groove 11 to fix the clamping means P to the mold 8.

By using the mold shown in FIGS. 5 and 6, the multilayer molded article having two sheets of the skin materials 1a and 1b is produced as follows:

First, the edge parts of the skin materials 1a and 1b are mated against each other and optionally bonded together. The mated edge parts are held in the parts Pa with pins Pp. Then, the clamping means P is inserted in the groove 11.

Figure 4:
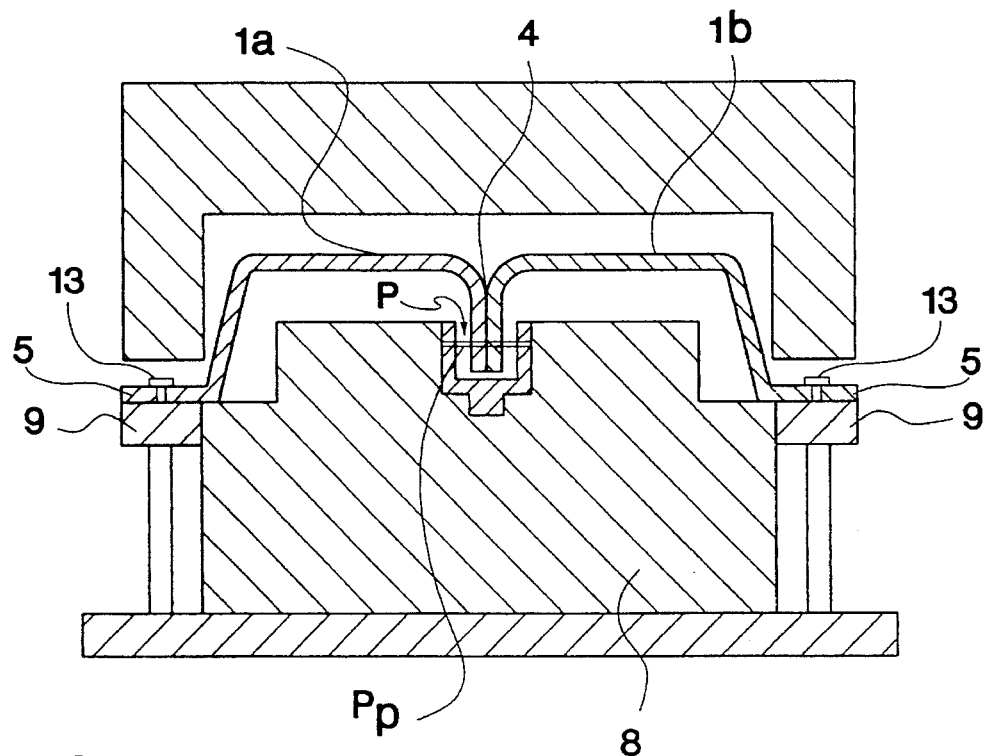

The periphery of the skin materials is placed on the clamping frame 9 and fixed with pins 13 (see FIG. 4).

The resin melt is supplied between the skin materials 1 and the mold 8. When the molds are closed, the supplied resin melt flows and spreads over the inner surface of the mold 8 through the conduits Pl.

Finally, the molds 7 and 8 are completely closed to finish the molding of the multilayer molded article.

Figure 7:
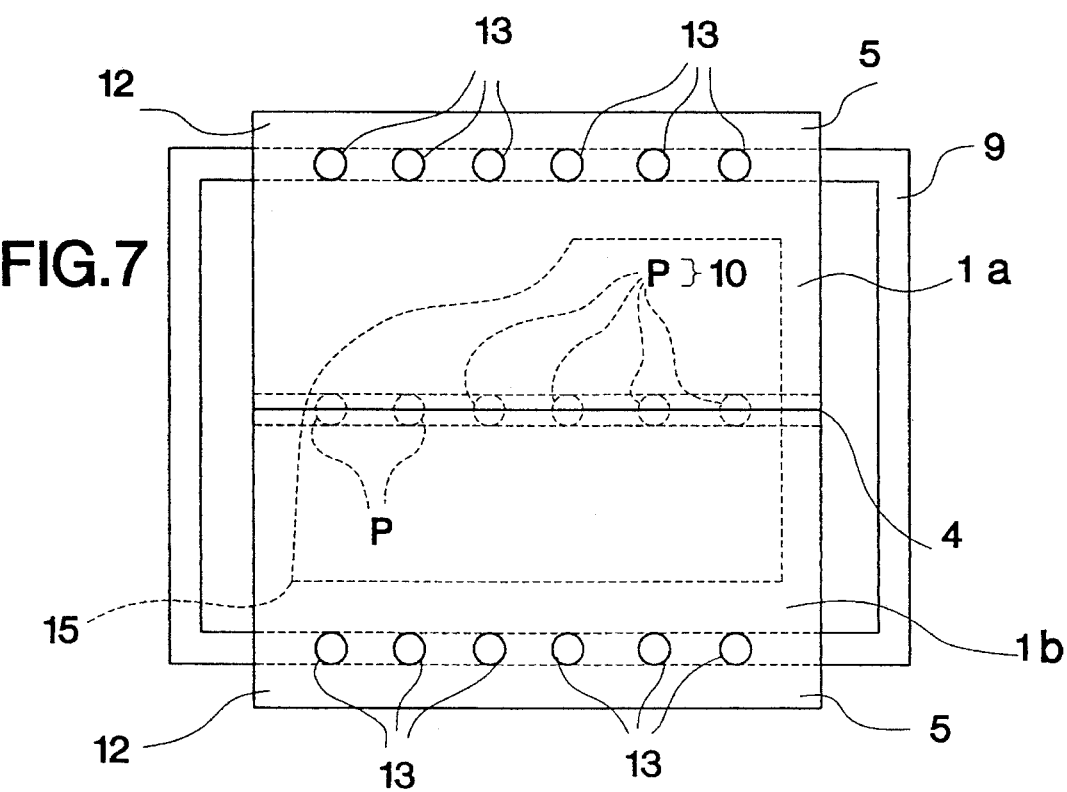
FIG. 7 shows a plane view of the clamped skin materials placed on the male mold.

FIG. 7 shows a plane view of the skin materials placed on the male mold 8. The broken like 15 indicates the periphery of the cavity. If necessary, marginal parts are cut out with a mold edge along the broken line 15.

What is claimed is:

1. A process for producing a multilayer molded article comprising a resin body and at least two sheets of skin materials which are 1a laminated adjacently on one surface of the resin body, which process comprises the steps of:

mating an edge part of one of the skin materials with an adjacent edge part of another of the skin materials;

clamping the mated edge parts of said skin materials with clamping means, said clamping means having a receiving opening for receiving and securing the edge parts of the skin materials therein, wherein the receiving opening includes pins disposed across said opening and through the edge parts of the skin materials so as to secure said edge parts in said clamping means;

inserting said clamping means into an engaging groove provide in a first mold which opposes a second mold;

spreading the skin materials between said first and second molds;

supplying a mass of resin melt between the skin materials and the first mold; and closing the first and second molds to form the multilayer molded article, wherein said mated edge parts of said skin materials are formed so as to be within the interior of said multilayer molded article;

wherein said receiving opening is a groove having alternating wide and narrow portions, said wide portions being conduits for allowing resin melt to pass therethrough.

2. A process for producing a multilayer molded article comprising a resin body and one sheet of a skin material laminated on a part of a surface of the resin body, which process comprises the steps of:

clamping an edge part of the skin material with clamping means, said clamping means having a receiving opening for receiving and securing the edge part of the skin material therein, wherein the receiving opening of said clamping means includes pins disposed across said opening and through the edge part of the skin material so as to secure said edge part in said clamping means;

inserting said clamping means into an engaging groove provided in a first mold which opposes a second mold;

spreading the rest of the skin material between said first and second molds;

supplying a mass of resin melt between the skin material and the first mold; and closing the male and female molds to form the multilayer molded article, wherein said edge part of said skin material is formed so as to be disposed within the interior or said multilayer molded article;

wherein said receiving opening is a groove having alternating wide and narrow portions, said wide portions being conduits for allowing resin melt to pass therethrough.

3. The method of claim 1, wherein edge portions of the skin material not secured by said clamping means are secured to said first mold with pins.

4. The method of claim 2, wherein edge portions of the skin material not secured by said clamping means are secured to said first mold with pins.

5. The method of claim 1, wherein the skin material is selected from the group consisting of woven fabrics, nonwoven fabrics, metal nets, fiber nets, thermoplastic resin nets, paper, metal foils, thermoplastic resin sheets, elastomer sheets, thermoplastic resin foams, and rubber foams.

6. The method of claim 2, wherein the skin material is selected from the group consisting of woven fabrics, nonwoven fabrics, metal nets, fiber nets, thermoplastic resin nets, paper, metal foils, thermoplastic resin sheets, elastomer sheets, thermoplastic resin foams, and rubber foams.

7. The method of claim 1, wherein the resin melt is formed from a resin selected from the group consisting of polypropylene, polyethylene, polystyrene, acrylonitrile-styrene-butadiene copolymer, nylon, ethylene-propylene copolymer and styrene-butadiene copolymer.

8. The method of claim 2, wherein the resin melt is formed from a resin selected from the group consisting of polypropylene, polyethylene, polystyrene, acrylonitrile-styrene-butadiene copolymer, nylon, ethylene-propylene copolymer and styrene-butadiene copolymer.

9. The method of claim 1, wherein said mated edge parts of said skin materials are bonded together with an adhesive or by welding before being clamped by said clamping means.

* * * * *